US006826230B1

(12) United States Patent
Salembier

(10) Patent No.: US 6,826,230 B1
(45) Date of Patent: Nov. 30, 2004

(54) METHOD AND SYSTEM FOR CODING AN IMAGE SEQUENCE CORRESPONDING CODED SIGNAL AND STORAGE MEDIUM AND METHOD AND SYSTEM FOR DECODING SUCH A CODED SIGNAL

(75) Inventor: Philippe Salembier, Barcelona (ES)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 08/688,917

(22) Filed: Jul. 31, 1996

(30) Foreign Application Priority Data

Aug. 2, 1995 (EP) .......................................... 954011813

(51) Int. Cl.[7] .................................................. H04N 7/12
(52) U.S. Cl. .................................................. 375/240.13
(58) Field of Search ................................ 348/390, 402, 348/415, 427, 699, 700, 384, 399, 400, 403–409, 416, 417, 418, 420, 422, 424, 425, 488; 375/240.13; H04N 7/12

(56) References Cited

U.S. PATENT DOCUMENTS

| | | | | | |
|---|---|---|---|---|---|
| 4,858,005 | A | * | 8/1989 | Lodge | 348/415 |
| 5,459,523 | A | * | 10/1995 | Tanaka | 348/427 |
| 5,596,362 | A | * | 1/1997 | Zhou | 348/700 |
| 5,608,458 | A | * | 3/1997 | Chen et al. | 348/699 |
| 5,612,751 | A | * | 3/1997 | Kondo | 348/402 |

OTHER PUBLICATIONS

Asai et al, "Video Sequence Coding Based Segment–Model and Priority Control", Proceedings of the International Picture Coding Symposium, pp. 325–328, Sep. 1994.*

"Motion and Region Overlapping Estimation for Segmentation–Based Video Coding" of M. Pardas and P. Salembier, IEEE International Conference on Image Processing, Austin, Texas, USA, Nov. 1994, vol. II, pp. 428–432.

"Time Recursive Segmentation of Image Sequences" of M. Pardas and P. Salembier, Eusipco 94, Viith European Signal Processing Conference, Edinburgh (United Kingdom), Sep. 13, 1994.

"Region Based Motion Analysis for Video Coding at Low Bitrates", H. Sanson, Proceedings of MPEG4 Seminar Paris (France), Mar. 1994.

"Spiral Image Compression by an Unrestricted Chain Coding Method", PN Nicholl and RJ Millar, 5th International Conference on Image Processing and Its Applications, UK, Jul. 4–6, 1995, pp. 564–568.

* cited by examiner

*Primary Examiner*—Young Lee
(74) *Attorney, Agent, or Firm*—Laurie E. Gathman

(57) ABSTRACT

The invention relates to an image sequence coding method comprising a segmentation of each image into partitions made of regions, an estimation and compensation of the motion of these regions between two partitions, and a region contour and texture coding step. The proposed motion estimation step of this method is carried out in a loop circuit (91, 92) in which, after a definition of the mode of transmission of the regions, a particular coded signal is generated for the background regions of the partition, said signal including an order information, indicating a priority between contiguous regions, and an associated updated motion information. The implementation of this method reduces drastically the computational load before the contour coding. The invention also relates to the corresponding decoding method and system.

2 Claims, 9 Drawing Sheets

| Item | Description |
|---|---|
| 81 | SEGMENTATION DEVICE |
| 82 | MOTION ESTIMATION DEVICE |
| 83 | ORDER EVALUATION DEVICE |
| 84 | CODING DEVICE |
| 85 | PARTITION RECONSTRUCTION DEVICE |

| Item | Description |
|------|-------------|
| 91 | TRANSMISSION MODE DEFINITION CIRCUIT |
| 92 | ORDER SIGNAL GENERATOR |

| Item | Description |
|---|---|
| 101 | COMPENSATING CIRCUIT |
| 102 | ERROR COMPENSATION GENERATOR |
| 103 | INTER-FRAME COST ESTIMATOR |
| 104 | INTRA-FRAME COST ESTIMATOR |
| 105 | SELECTOR |
| 106 | UPDATED MOTION GENERATOR |
| 107 | MAXIMUM VALUE DETECTOR |
| 108 | POSTPROCESSING CIRCUIT |

| Item | Description |
|---|---|
| 111 | MOTION FIELD EXPANSION CIRCUIT |
| 112 | UPDATING CIRCUIT |
| 113 | ORDER QUANTIZER |

| Step | Description |
|------|-------------|
| 121a | INTRA-REGION DECODING |
| 122a | PERFORM MOTION COMPENSATION |
| 123a | RECONSTRUCT PARTITION |

| Item | Description |
|------|-------------|
| 130 | INTRA-REGION DECODING CIRCUIT |
| 131 | INPUT BUFFER |
| 132 | DECODING STAGE |
| 133 | MASK DEFINITION STAGE |
| 140 | MOTION COMPENSATING CIRCUIT |
| 150 | DECODING CIRCUIT |
| 151 | OVER-PARTITION DECODING STAGE |
| 152 | LABEL DECODING STAGE |

METHOD AND SYSTEM FOR CODING AN IMAGE SEQUENCE CORRESPONDING CODED SIGNAL AND STORAGE MEDIUM AND METHOD AND SYSTEM FOR DECODING SUCH A CODED SIGNAL

BACKGROUND OF THE INVENTION

The present invention relates to a method of coding an image sequence, comprising the steps of:

transforming the images of said sequence into successive segmented images comprising a plurality of regions and associated labels defining partitions;

estimating for the regions of the current partition a motion information about the evolution of said segmentation from the previous partition;

encoding the contour and texture of each region of said current partition;

generating on the basis of said encoded partition a corresponding reconstructed partition.

The invention also relates to a system for coding an image sequence, comprising: a segmentation device, for generating successive partitions comprising a plurality of regions, a motion estimation device, for the evaluation of the motion of said segmentation from a previous partition to the current one, an order information evaluation device, for defining a priority in the coding order of said regions, a coding device, for coding contour and texture signals for all regions of the current partition, and a partition reconstruction device. Additionally, the present invention relates to a coded signal as obtained at the output of such a system as well as to a storage medium for storing said coded signal.

The invention also relates to a method of decoding coded signals corresponding to the regions of each successive partition of a segmented image sequence, and to a decoding system for carrying out said decoding method.

In the following description, the word "image" has to be understood according to its widest meaning. It is indeed clear that the invention deals not only with conventional images in which at least a luminance signal is associated to each picture element, but also more generally to any set of tridimensional data (u, v, w) among which two of them define a kind of position within a predetermined frame and the third one a value varying within a given range and respectively associated to each pair of data. The proposed method offers however a substantial interest for all segmentation-based coding techniques and can be used particularly in video terminals that use a motion compensated coding of the partition issued from the segmentation. Such techniques are mainly useful for very low bit rate applications, and a standardization under the reference MPEG4 is contemplated (MPEG is an acronym for "Moving Picture Experts Group", which is a group of experts of the International Standardization Organization ISO).

The basic idea of segmentation-based coding of image sequences is to define a partition of said images that is more appropriate for coding than the conventional block-based coding schemes. A conventional segmentation-based coding method involves mainly the following steps: definition of the partition, coding (and transmission) of the partition, coding (and transmission) of the pixel values inside each region defined by the partition. Two modes of transmission can be distinguished: the intra-frame mode, which consists in sending the information about the partition of each frame independently, and the inter-frame mode, which relies on the characterization and coding of the time evolution of the partition from one frame to the next one (and is often much more efficient than the intra-frame mode).

The inter-frame mode of partition coding generally relies on the following steps:

(a) segmentation of the frames (the present invention will address the general problem of partition coding by motion compensation and does not rely on any specific segmentation scheme);

(b) estimation of the motion of the partition between an earlier partition and the current one;

(c) prediction by motion compensation of said earlier partition;

(d) computation of the prediction error;

(e) coding of this prediction error, the coded error being then transmitted (individually for each region of the partition).

The motion estimation analyzes the movement of objects between two successive frames and leads to a motion information represented by a set of parameters that are assigned to each region. This motion information, combined with a stored reconstructed partition, allows to carry out the motion compensation, and the difference between the current segmented frame and the reconstructed partition gives the prediction error, which can be coded and transmitted.

However a distinction has to be made between the motion of the shape of a region and the motion of the pixels inside a region. Indeed, both notions coincide in the case of an object placed in the foreground of another one: either the contours of the region of the partition corresponding to that object or its texture can indifferently be considered, the pixels of the interior of this region and its contours following the same motion. This is no longer the case for a background object, because the modifications of the shape or contours of the region corresponding to this background object are generally not defined by the motion of its interior but by the motion of the foreground regions overlapping that background region.

For background regions it is therefore necessary to perform two different motion estimations, in order to have different motion compensations for contours and for textures, the first estimation being used for contour coding and the second one for texture coding.

The communication "Motion and region overlapping estimation for segmentation-based video coding" of M. Pardas and P. Salembier, IEEE International Conference on Image Processing, Austin, Tex. (USA), November 1994, volume II, pp.428–432, describes an object-based video coding system in which it is indeed avoided to perform two different motion estimations for the background regions. The motion estimation for contours is replaced by an extra information called order relation between regions and which allows to know for every couple of neighbouring regions which of them is in the foreground. To this end one performs for every boundary between two neighbouring regions a two hypothesis test consisting in calculating the prediction error in each region for the two possible order relations and selecting the order that yields the lowest one. It however appears that the implementation of this method of determination of said order information leads to a very high computational load: a prediction error has to be calculated twice for each region and, moreover, a lot of these computations are not useful since the corresponding regions will finally perhaps be coded according to the intra-frame mode, i.e. without re-using the error predictions.

SUMMARY OF THE INVENTION

It is therefore a first object of the invention to propose a different and more efficient coding method, leading to a reduced and less expensive computational load. This object is achieved by means of a method as defined in the preamble of the description and in which the motion information estimation step comprises in cascade the sub-steps of:

defining for each region of said current partition, on the basis of a comparison between this current partition and a partition compensated from said reconstructed partition and said motion information, an intra-frame or interframe contour transmission mode;

defining for each pair of neighbouring regions of said current partition, on the basis of a comparison between respective motion informations associated to these two regions, an auxiliary order information and an updated motion information.

The proposed method is more efficient than the one described in the previously cited document in that the determination of the order information is carried out by way of a global estimation of both the mode of transmission and the order information, said mode of transmission being taken into account for each region of the partition issued from the segmentation and no longer by considering that all regions of a given frame are transmitted in the same mode.

In a more efficient implementation, the method includes a contour transmission mode definition sub-step in which information is sent backwards in order to constitute a loop in which said order information updates the definition of said contour transmission mode.

According to the invention, this method may also be advantageously characterized in that:

(A) said contour transmission mode definition sub-step comprises for each region individually the operations of:
 compensating on the basis of the motion information associated with each successive region of the current partition said corresponding reconstructed partition;
 computing on the basis of a comparison between said current partition and said corresponding compensated partition a compensation error;
 generating as a motion information and on the basis of a comparison between coding costs of said current partition and said compensation error a decision related to the transmission mode of the contour of the concerned region;

(B) said auxiliary order information definition sub-step comprises the operations of:
 defining a motion vector for each position inside the concerned region and assigning said vector to all points of the current partition;
 generating the order information corresponding to each of the concerned regions, on the basis of a comparison between said current partition and said reconstructed partition when considering said assigned vector;
 quantizing said order information by comparing for each pair of labels associated with two concerned regions the number of occurrences where the first label has been declared to be in the foreground of the second one and the reciprocal number and selecting the largest one.

A further object of the invention is to propose a coding system for implementing a method as previously indicated.

This object is achieved by means of a coding system as described in the preamble of the description and in which said order information evaluation device is a decision-directed sub-system comprising a transmission mode definition circuit, provided for assessing the coding costs of the contour information in intra-frame and inter-frame modes and defining a first updated motion output signal including an updated motion information and a corresponding transmission mode information, and an order computation circuit, provided for associating to said first updated motion signal a second order signal and comprising:

motion field expansion block, in the form of a first scanning loop for extending, for each region, its motion model to all points of the partition and defining an order information for said concerned region, and of a second scanning loop for iterating said motion field expansion for all regions of each current partition;
 an updating block;
 a quantization block, for taking a majority rule decision related to the final order of each region;
the output of said order information evaluation device associating said final order signal and said updated motion signal.

A further object of the invention is to define a coded signal such as generated by such a coding system, said coded signal corresponding to each region of each successive partition of a segmented image sequence and comprising, for each pair of regions of a partition considered as in conflict as soon as their contour and texture motions differ, a first coded signal, corresponding to the texture signal of each concerned region and to the corresponding motion information that characterizes the evolution of said region between the previous partition and the current one, and auxiliary signals, corresponding to an order signal, defining for each considered pair of regions said in conflict which of them is in the foreground of the other one, and to an associated updated motion information. A further object of the invention is to propose a storage medium for storing said coded signal.

A further object of the invention is finally to propose a method of decoding such a coded signal, said decoding method then comprising the steps of:

(a) decoding the regions that have been previously coded in intra-frame mode and creating a corresponding mask by assigning the corresponding labels to these regions and a zero label to the other ones;

(b) generating a compensated partition made of intra-frame coded regions, motion compensated regions and holes corresponding to empty areas;

(c) decoding the error regions and generating a socalled over-partition made of the intersection between the compensated regions and the set of transmitted error regions, the labels of the regions of said over-partition being decoded and assigned; and to propose a corresponding decoding system.

BRIEF DESCRIPTION OF THE DRAWINGS

These and other aspects of the invention will be apparent from and elucidated with reference to the embodiments described hereinafter and to the drawings, in which.

DETAILED DESCRIPTION OF THE PREFERRED EMBODIMENTS

The invention will now be described while using the following notations:

the original images at times (T−1), T, . . . , are called ORIG(−1), ORIG(O), . . . , and so on;

the partitions are called SEG(O) for the current partition at time T, SEG(−1) for the previous partition at time (T−1), and so on if necessary for other partitions at other partitions at other times;

similarly REC(O) and REC(−1) designate the current (at time T) and previous (at time (T−1)) partitions as they would be reconstructed on the receiver side after transmission, and as they are obtained in the encoding device (REC(O), REC(1), . . . , are not exactly the same as SEG(O), SEG(1), . . . , owing to the losses during the partition coding process);

MOT(O) is the motion information that characterizes the evolution of the partition between (T−1) and T (that is to say that allows to deduce SEG(O) from SEG(−1)), and is generally represented by a set of parameters that are assigned to each region of the previous partition SEG(−1).

As already said, the objective of the invention is not to address the problems of segmentation and motion estimation, and it is therefore assumed that SEG(−1), SEG (O), REC(−1), MOT(O) are known. An implementation of a segmentation method is for instance described in the communication "Time Recursive Segmentation of Image Sequences" of M. Pardas and P. Salembier, EUSIPCO 94, VIIth European Signal Processing Conference, Edinburgh (United Kingdom), Sep. 13th, 1994, while for the purpose of motion estimation a method as described in the document "Region-based motion analysis for video coding at low bitrates", H. Sanson, Proceedings of MPEG4 Seminar, Paris (France), March 1994, can be proposed.

Figure 1:
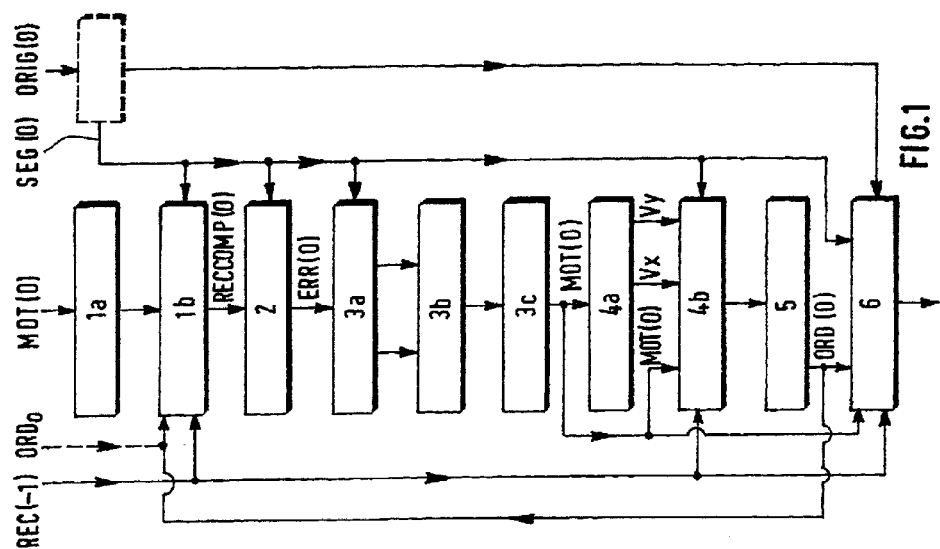
FIG. 1 is an illustration of the method of segmentation according to the invention.

These indications being given, the coding method according to the invention is schematically shown in FIG. 1. Said method comprises in cascade the following steps: first a definition of the transmission mode of each region (from 1a to 3c), and then the order computation (from 4a to 5). Indeed, in practice, it may not be always efficient to send all regions in inter-frame mode. For instance, if the motion estimation has not produced reliable results or if the motion of the region cannot be modeled by the motion estimation, the prediction error of the region shape may be so large that it may be less expensive to code directly the entire region (by switching from inter-frame mode to intra-frame mode).

For the first step of definition of the transmission mode, the input data are the current segmented partition SEG(O) (obtained from the corresponding original image ORIG(O)), the previous reconstructed partition REC(−1), and the motion information MOT(O) associated to the partition SEG(−1). The objective of this first step is to define the transmission mode (intra-frame mode or inter-frame mode) of each region, by sending a binary information used to say to the receiver whether or not the region is transmitted in intraframe mode for contour coding and stored for instance within the motion information MOT(O). This motion information MOT(O) will therefore involve a set of motion parameters for each region (as already said) plus a binary information indicating the transmission mode of the associated contours. The decision about this transmission mode is taken on the basis of the cost of the contour, by comparing the cost of each region according to the fact that it is sent in intra-frame mode or in interframe mode. As shown in FIG. 1, three sub-steps are considered in this first step.

Figure 2:
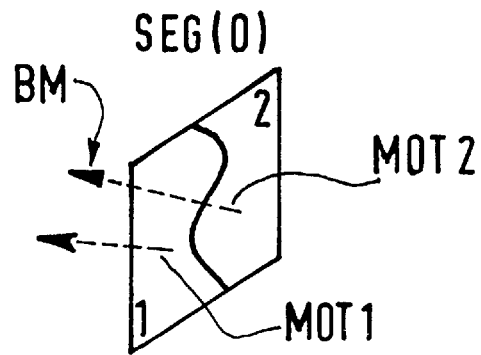
FIG. 2 illustrates, for the motion estimation of the regions of the current partition, the vectors that, for each represented region, describe the time evolution of the region in a backward mode.
Figure 3:
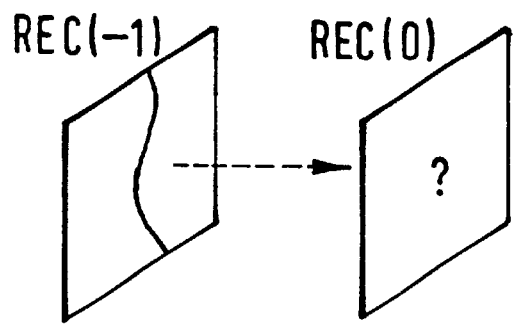
FIG. 3 illustrates the partition compensation provided for defining a prediction of the current partition.

The first sub-step (1a, 1b) is provided for compensating the whole partition. Based on the previous reconstructed partition REC(−1), the motion information MOT(O) and the order information, called ORD(O), this partition compensation, comprising two operations (1a) and (1b), will lead to a compensated partition called RECCOMP(O). Although these two operations are described later in a more detailed manner, the general philosophy of this partition compensation may be however discussed now, and is illustrated in FIGS. 2 and 3. Before the compensation, the motion of the various regions of the current partition SEG(O) will be estimated. The obtained motion estimation gives a set of parameters describing the time evolution by each region in a backward mode BM. In FIG. 2, only one vector (MOT1 and MOT2) has been represented for each region of SEG (O), but the estimation generally gives more complex models defining one motion vector for each pixel of each region. Having noted that the motion of the pixels inside a region (texture motion) and the motion of the shape of a region may not be equivalent (both motions coincide in the case of foreground regions, for which the pixels of interior and contours follow the same motion, but it is not the case for a background region because the modifications of its shape or of its contours are defined by the motion of the regions in its foreground), it is assumed that the texture motion is used to compensate both the partition and the texture. The partition compensation problem is then shown in FIG. 3: based on the previously reconstructed partition REC(−1) and on the transmitted motion parameters, the compensation should define a prediction of the current partition REC(O).

Figure 4:
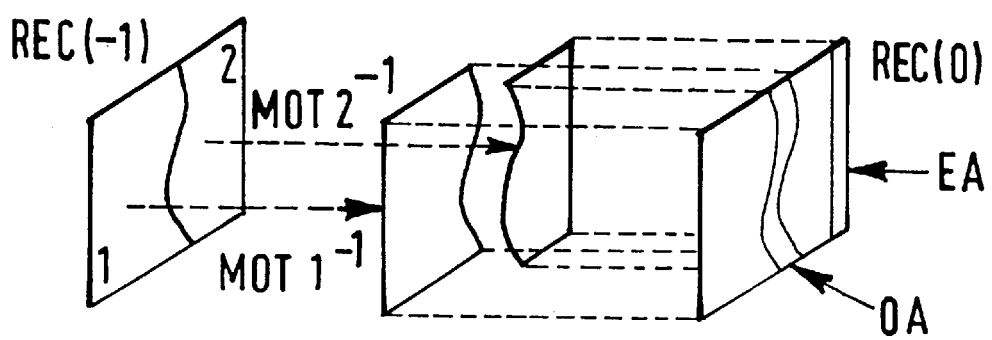
FIG. 4 illustrates a forward motion compensation of partition, and FIG. 5 a backward motion compensation of partition.

The compensation itself can work either in a forward mode or in a backward mode. As shown in FIG. 4, in the forward mode, the pixels of REC(−1) are projected towards REC(O). This projection can be done if the motion vectors MOT1 and MOT2, as defined by the estimation done in a backward mode, are inverted (MOT1 1 and MOT2 1). As can be seen, two problems may result from the transformation of the regions.

Some pixels of REC(O) may have no label, they constitute the so-called empty areas (only one, called EA in FIG. 4). By contrast, some pixels may have several label candidates, these conflicting areas are called overlapping areas (only one, called OA in FIG. 4). To solve the conflicts, the order information is used to decide which region is considered to be in the foreground of which region (in case of conflicts between labels, the foreground region gives the correct label). The problem of overlapping areas is specially important if the texture motion is used to compensate the partition because of the issue of foreground/background relationship between regions commented above. However, the use of the texture motion and of the order is a quite efficient solution because the texture motion information leads to a good compensation of the texture and the order only represents a small amount of information. Finally, the empty areas are left without label and are processed as compensation errors.

Figure 5:
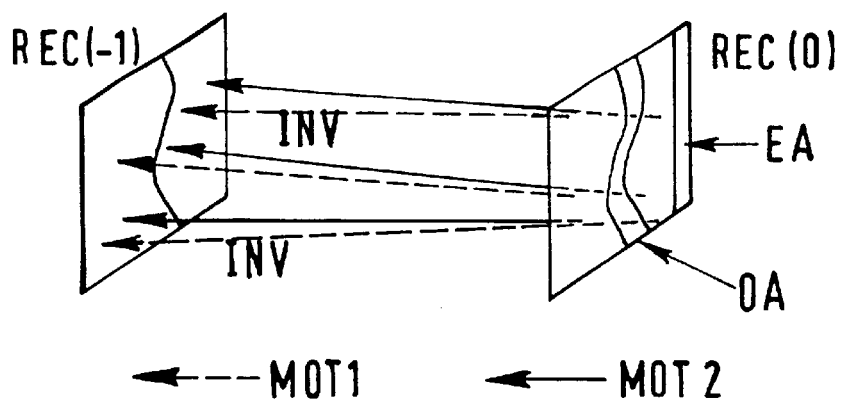

The dual mode of compensation is illustrated in FIG. 5. It is a backward mode in the sense that, for each pixel of REC(O), one tries to look on REC(−1), which label has to be selected. In this case, the main problem is to define which motion vector has to be used when a pixel (i,j) of REC(O) is considered. Indeed, since the current partition is not yet known on the receiver side, one does not know the region the pixel belongs to and therefore its corresponding motion model. The solution consists in considering all possible vectors defined by all possible regions. In the case of FIG. 5, there are two regions, and two vectors are therefore considered for each point: one given by region 1 (MOT1) and one given by region 2 (MOT2). Each time a vector as defined by a region n does not point to a pixel belonging to region n in REC(−1), the compensation is considered as being invalid and the corresponding vector (INV) is discarded (in FIG. 5, this is the case for two vectors). However, as in the case of forward motion compensation, some pixels have no valid compensation (empty area EA) and some others have more than one candidate (overlapping area OA). As previously, the order information is used to solve the conflicting areas.

The main difference between the forward and backward modes of compensation deals with the quantization of the pixel locations. Indeed, generally, the motion vectors start from an integer pixel location but point to a non-integer location. In the forward case, it is the locations of pixels of REC(1) that have to be quantized whereas in the backward case, the locations of pixels of REC(-1) have to be quantized. There are some more difficulties related to the forward mode in the case of motion models involving modifications of the scale (zoom in particular). Indeed, in the case of region expansion, the modification of the distance between two pixels may create more empty areas in the compensated frame. These problems can be solved but generally the backward mode is more simple.

As previously indicated, the partition leads to a compensated partition RECCOMP(O). In a second sub-step (2), a compensation error ERR(O) is then computed by way of a subtraction between SEG(O) and RECCOMP (O). Finally, a third sub-step (3a, 3b, 3c) is provided for estimating and comparing the coding costs of each region individually, as defined by SEG(O) (intra-frame mode) or by ERR(O) (inter-frame mode). The estimations (3a) in intra-frame mode and inter-frame mode can be done either by actually coding the information and measuring the resulting amount of information or by using any other technique that provides an approximation of the cost (for example, by assuming that the cost is proportional to the length of the contour of the region). Once both estimations have been performed, the comparison and selection (3b) can be done and the resulting decision is stored (3c) as the additional binary information updating the motion information MOT(O).

Figure 6:
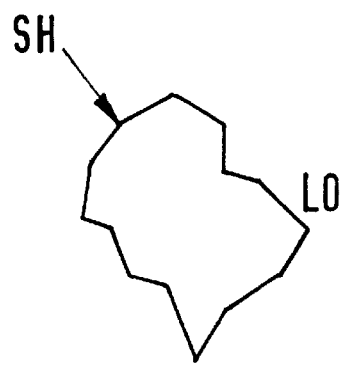
FIGS. 6 and 7 illustrate the shape coding in intraframe mode and in inter-frame mode respectively.
Figure 7:
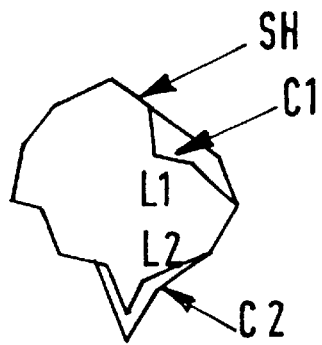

The objective of this estimation is to assess the coding cost of the shape information if the region is coded in intra-frame mode or in inter-frame mode. The problem is illustrated in FIGS. 6 and 7.

According to the first option (FIG. 6), it is considered that the region is sent in intra-frame mode. In this case, all the contours of the shape SH have to be coded. One can either actually code it by classical contour coding techniques and compute the resulting number of bits or make an estimation saying for example that the resulting cost is proportional to the length $L_0$ of the contour of the concerned region (the cost can be estimated as $C_{intra}=kL_0$). The second option (FIG. 7) consists in coding only the compensation error. In the example of FIG. 7, only two small contour segments C1 and C2 have to be coded because the shape compensation corresponds quite well to the real shape. To get the cost, one can actually code the two segments of lengths $L_1$ and $L_2$ by classical techniques as before or make an estimation (for example $C_{inter}=1,7$ (L1+L2). The multiplicative factor is higher than previously to take into account the increased number of starting points. However, this factor depends on the technique that is going to be really used. Once both costs have been computed or estimated, the decision (selection of the lower cost) is taken by comparing them. If $C_{inter}$ is lower than $C_{intra}$, the region will be sent in inter-frame mode, otherwise it will be sent in intra-frame mode. The resulting decision is stored (3c) as the additional binary information updating the motion information MOT(O).

The first step of definition of the transmission mode is followed by the second step of order computation, which can be decomposed, as shown in FIG. 1, in a first sub-step (4a, 4b) and a second sub-step (5). This first sub-step is provided for estimating a set of order parameters and the second substep for achieving a quantization of the order information for the transmission. The first sub-step (4a, 4b) relies on a double loop, one of them scanning the regions defined by their label and the other one scanning the positions (i,j) of the image space, and involves two operations in cascade.

The first operation (4a) is provided for defining a motion vector for each position (i,j) of the region corresponding to the concerned label. The motion information MOT(O) gives indeed for each region a motion model which is a function of the position (i,j). For instance, if the motion model for a given region is a translation (dx, dy), then this motion vector is assigned to all points (i,j) of the image. If the motion model is an affine model (a1, a2, a3, a4, a5, a6), then the motion field at the point (i,j) is defined as $Vx(i,j)=a_1i+a_2j+a_3$ and $Vy(i,j)=a_4i+a_5j+a_6$. If the region has to be transmitted in intra-frame mode, this motion field expansion is not performed.

The second operation (4b) is provided for updating the order corresponding to the concerned region. The order information consists in a list of possible regions in conflict, i.e. of regions of REC(-1) that may overlap with other regions during the motion compensation. Such an order list is set to zero at the beginning of the process. If one denotes by LABSEG(O) and LABREC(-1) the region labels of the current pixel (i,j) in the current partition SEG(O) and of the pixel (i-Vx(i,j), j-Vy(i,j)) in the previous reconstructed partition REC(-1), the list entry corresponding to the conflict between the region of label REGNUM (REGNUM is a working label associated to each region successively considered in the current partition SEG(O)) and the region having the current label LABSEG(O) is updated if the following conditions are fulfilled:

(a) the current label LABSEG(O) is different of any label of a region transmitted in intra-frame mode: in that situation (i.e. if the point (i,j) in the current partition SEG(O) corresponds to a region which is transmitted in intraframe mode), any compensated label that falls in such a position is discarded;

(b) the previous label LABREC(-1) is identical to the label REGNUM: the point (i,j) of the current partition SEG(O) is then a candidate to receive this label REGNUM;

(c) the current label LABSEG(O) is not identical to the label REGNUM the correct label of the pixel (i,j) is then not REGNUM, and the regions with the current label LABSEG(O) and the label REGNUM (=LABREC(-1)) are conflicting regions, the first one being in the foreground of the second one (the list entry corresponding to the conflict between the labels LABSEG(O) and REGNUM is then incremented by one unity).

This procedure is iterated for all points (i,j) and for all labels REGNUM, the order list finally giving the number of occurrences where it has been possible to declare that a given region is in the foreground of another region.

The second step (5) is then provided in cascade with the first one for quantizing the order (the receiver will only need a binary decision in order to be able to solve the situations with conflicting labels during the motion compensation). This quantization is achieved by comparing for each pair of labels the number of occurrences where the first one has been declared to be in the foreground of the second one with the number of occurrences where that second one has been declared to be in the foreground of the first one. The final order between the two concerned regions is defined as the one corresponding to the largest number of occurrences. This order ORD(O) may then be sent backwards for use as an input for the sub-step (1a, 1b), in order to constitute an iterative loop in which said order information allows to update the definition of the contour transmission mode. The number of the iterations is kept low if one wants not to increase the computational load. In practice, only two or three iterations are sufficient. It must be noted, in this case of an iterative loop, that the partition compensation cannot be done if the order information ORD(O) is not known. To solve this problem, it is simply supposed on a first iteration that all new regions (that is to say regions which are present in SEG(O) and not present in REC(−1) are transmitted in intra-frame mode and that all other regions are sent in inter-frame mode, which is equivalent to give to ORD(O) an initial value designated by the reference $ORD_o$ in FIG. 1. Finally, once the order information has been defined, the encoding step of the coding method, designed by the reference (6) in FIG. 1, can be carried out, for instance by following the contour/texture coding approach described in the already cited document "Motion and region overlapping estimation . . . ", IEEE-ICIP, November, 1994.

The above-mentioned partition compensation will now be described in a more detailed manner. This sub-step (1a, 1b) is intended to realize the compensation of the previous reconstructed partition REC(−1) and comprises several operations. Since the region a particular point (i,j) of the compensated partition belongs to is not known, all possible motion parameters assuming successively that this point belong to all possible regions (of label REGNUM) have to be tested. Therefore the first operation (1a) is provided for defining a motion field for the entire image while using the motion parameters assigned to a single region, the current one of label REGNUM. For the operation (1a), it is temporarily assumed that all pixels of the image belong to the region REGNUM. Generally this operation (1a) can be easily done because the motion information gives for each region a motion model which is function of the position (i,j). As for the operation (4a), if the motion model for a given region is a translation, this translation vector is assigned to all points (i,j) of the image. If the motion model is an affine one, then the motion field at every point (i,j) is defined by this model. This definition operation, similar to that one previously described (first operation (4a) of the first sub-step of the second step "order computation"), is followed by a second operation (1b) of compensation, according to which, for each pixel (i,j) of the compensated partition RECCOMP (−1), the compensated label is defined as follows (the procedure being iterated for all pixels (i,j) and for all regions, that is to say for all labels REGNUM):

(a) if the pixel (i,j) corresponds to a region which has been transmitted in intra-frame mode, the label is not compensated: any compensated label that falls in that region is discarded;
(b) if the previous label LABREC(−1) (i.e. the region number of the pixel (i−Vx(i,j), j−Vy(i,j)) in the previous partition REC(−1) is identical to the current label REGNUM), the compensation is valid and the pixel (i, j) is a candidate to receive the label REGNUM;
(c) if the location (i,j) of the compensated partition is empty, the label LABREC(−1) must be assigned to that position;
(d) if the location (i,j) has already been assigned a label, this compensated label is in conflict with the previous label LABREC(−1), but this conflict can be solved by the order information stored in ORD(O): the label is the one corresponding to the foreground region as defined by ORD(O).

This procedure is iterated for all points (i,j) and for all possible regions of label REGNUM. At the end, the compensated information can be post-processed in order to create a partition. Indeed, the previous compensation technique does not guarantee the definition of connected regions and in practice several connected components may have the same label. To solve this problem, a two step procedure may be used. The first step selects one connected component for each label. Several criteria may be used. A simple one consists of selecting the largest component (note that this selection can be done at the receiver side without the need of transmission of any overhead information). The elimination of some connected components will create some holes in the partition, i.e. some regions which correspond neither to a region sent in intraframe mode nor to a compensated label. These holes can be left and processed as individual regions by the following step or they can be removed. For example, a hole can be eliminated by a propagation of the neighbouring labels or by assigning it to the largest neighbouring, etc. At the end of this procedure, one has the final compensated partition RECCOMP(O).

Figure 8:
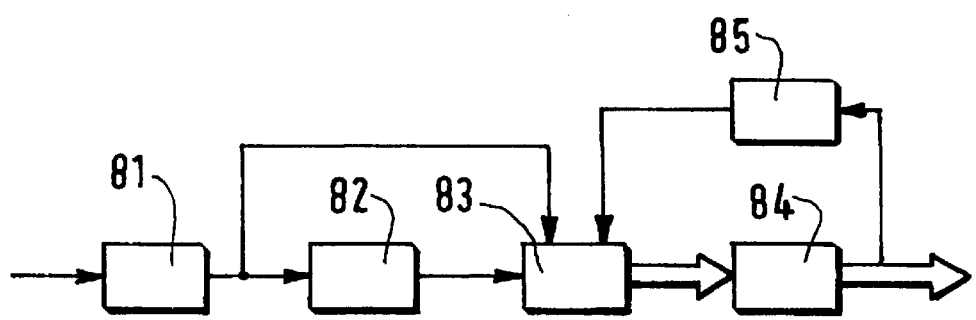
FIG. 8 shows an embodiment of a coding system carrying out the method according to the invention.
Figure 9:
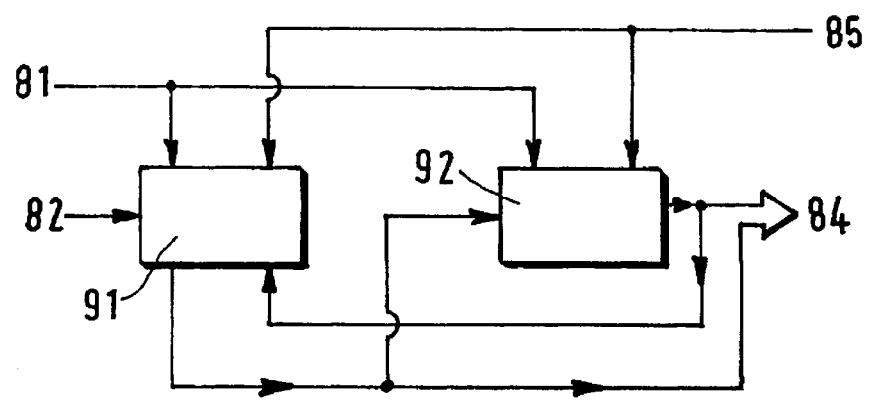
FIGS. 9 to 11 show in a more detailed manner some devices of the coding system of FIG. 8.
Figure 10:
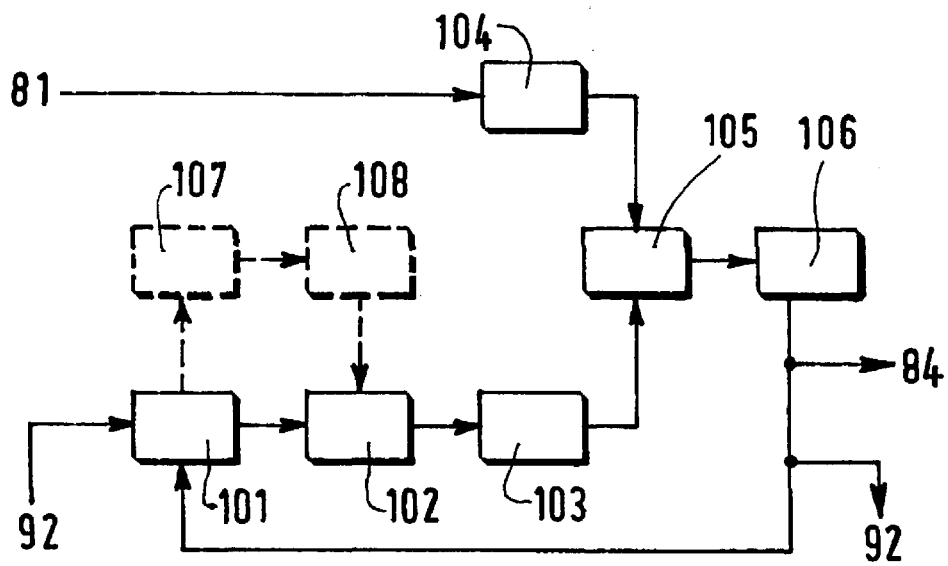
Figure 11:
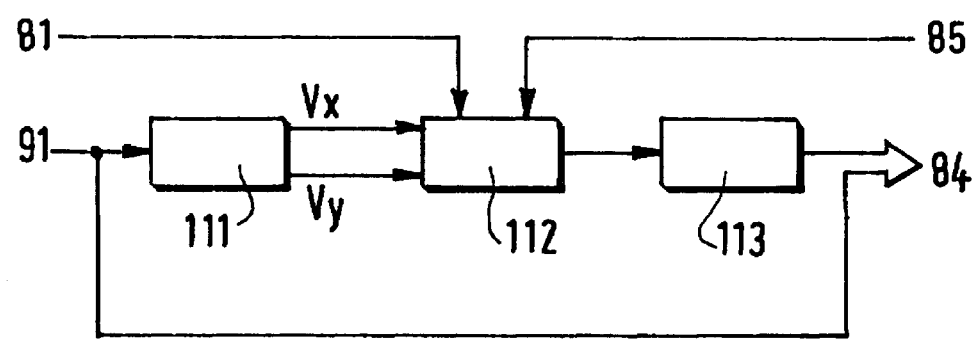

The coding method which has been described above can be implemented in several manners, for instance with the aid of wired electronic modules as described in the system of FIG. 8, detailed in FIGS. 9 to 11. This coding system comprises in cascade a segmentation device 81 generating the successive partitions to be coded, a motion estimation device 82 for the evaluation of the motion of the regions of each current partition with respect to the previous one, an order evaluation device 83 for defining the priority between the regions of the current partition to be coded, a coding device 84 that implements the texture and contour coding step for each region of the current partition, and a partition reconstruction device 85.

According to the invention, the order evaluation device 83 comprises a decision-directed sub-system organised in the form of a loop including a first circuit 91 for the definition of the transmission mode (intra or inter) of each region and a second circuit 92 for the order computation. The first circuit 91 receives the current partition SEG(O) from the device 81, the previous reconstructed partition REC(−1) from the device 85, the motion information MOT(O) from the device 82, and the output order signal of the second circuit 92. The second circuit 92 receives the output updated motion information available at the output of the first circuit 81, the current partition SEG(O), and the previous reconstructed partition REC(−1), and its output is the order signal sent both towards the fourth input of the first circuit 91 and, together with said updated motion information, towards the coding device 84.

The first circuit 91, provided for comparing the coding cost of the contour information in intra-frame and inter-frame modes, comprises a selection sub-assembly (103 to 106) for carrying out an estimation of the coding costs in intra-frame mode (in coding blocks 103 and 104, at the outputs of which the resulting amounts of information are measured) and, after a comparison of both costs, the selection (block 105) of the smaller one and of the corresponding updated motion information (block 106). In the circuit 104, the coding cost is directly computed from the partition SEG(O), while in the circuit 103, it is computed after the previous computation (in a block 102) of a compensation error deduced from an estimation of a compensated partition. Said compensated partition is available at the output of a compensating block 101. However, as this compensation may not guarantee the definition of connected regions (several connected components may have the same label), a selection of only one connected components is done (for instance the greatest one, in a block 107) and the holes corresponding to the eliminated other ones (i.e. regions which correspond neither to a region sent in intra-frame mode nor to a compensated label) are, in a postprocessing block 108, either left and processed as individual regions or removed.

The second circuit 92, provided for generating the order signal, comprises a motion field expansion block 111, an updating block 112 and a quantization block 113. The block 111 assigns for the entire image the motion field deduced from the motion parameters assigned to each concerned region, and the block 112 then carries out the updating of the motion information. The block 113 achieves a quantization of the order information by generating a binary number corresponding, for each pair of examined labels (i.e. of concerned regions), to the label corresponding to the greater number of occurrences of a situation where said label has been declared to be in the foreground of the other one.

Obviously, other implementations of the coding system are possible, and especially an implementation in the form of module(s) including a processor or a microprocessor that ensures the performance of series of instructions corresponding to the functions, computations and other operations carried out within the previously described coding system.

Moreover, the invention also relates to a coded signal as defined at the output of such a coding system (whatever its embodiment), and consequently to any storage medium on which that signal is stored (if it is not immediately transmitted or, when it is transmitted, if it is not immediately used at the reception side). This coded signal includes several kinds of information. It first includes a coded signal corresponding to the texture signal of each region of the current partition and to the corresponding motion information that characterizes the evolution of said region between the previous partition of the segmented sequence and the current one and allows to compensate its displacement from the former to the latter. It also includes, as they have been previously defined, the order signal defining for each considered pair of regions in conflict which of them is in the foreground of the other one and the corresponding updated motion information. If such a complex coded signal is generated, it is however not necessarily transmitted immediately, but only stored in order to be transmitted later, or it may be transmitted but not used immediately at the reception side. In both cases, this coded signal will be stored, and the invention relates to the storage medium on which this signal is stored.

Figure 12:
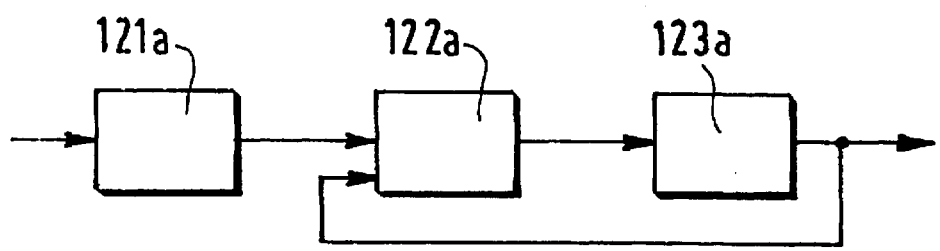
FIG. 12 is an illustration of a method for decoding signals coded as indicated above.

Moreover, the invention is obviously not limited to the previous embodiments and further relates to a method for decoding a coded signal such as described above, and to a corresponding decoding sub-system. The decoding method, illustrated in FIG. 12, involves the following steps: an intra decoding step 121a, a motion compensation step 122a, and a partition reconstruction step 123a, the output of which both constitutes the current reconstructed partition and is used for the following decoding step.

Figure 13:
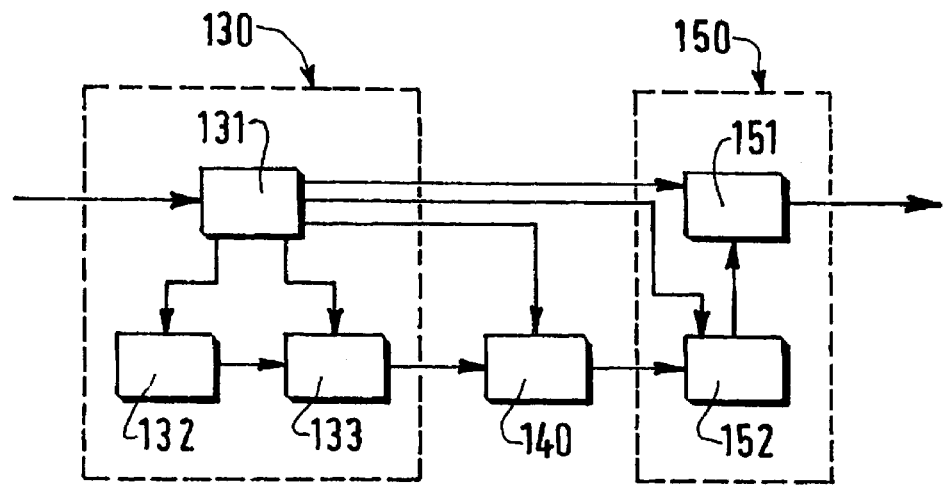
FIG. 13 shows an embodiment of a decoding circuit included in a decoding subsystem carrying out this method.

The first decoding step 121a, carried out, as indicated in FIG. 13, by an intra region decoding circuit 130, is provided for a restitution of the contours of the regions that have been sent in intra-frame mode. The corresponding decoding circuit comprises a decoding stage 132 that allows to reconstruct the regions sent in intra-frame mode, according to the specific technique that has been used for the shape coding at the transmitting side (for example, in the case of a chain code method such as described for instance in the communication "Spiral image compression by an unrestricted chain coding method", P. N. Nicholl and R. J. Millar, 5th International Conference on Image Processing and its Applications, UK, 4–6 Jul. 1995, pp.564–568, the basic method for such a reconstruction is to read from the input buffer 131 of the decoding circuit the location of the starting point of the contours and then to read the successive displacements of the chain, such as right-turn, left-turn, straight ahead, in order to draw the decoded contours). Once the set of contours is drawn, a mask definition stage 133 allows to assign the various labels to each region and a zero label to the other regions (that will be transmitted in interframe mode). A mask indicating these regions is therefore created.

The second motion compensation step 122a can be done as previously indicated (the corresponding compensating circuit 140 will therefore not be described in a more detailed manner), the order information being used to solve conflicts appearing when two different labels may be assigned to the same location (the label corresponding to the foreground region as defined by said order information is assumed to be the correct one). The compensated partition is made of intra-frame coded regions, motion compensated regions and holes corresponding to empty areas (where no labels have been assigned during the compensation process).

Once this compensated partition is available, the third partition reconstruction step 123a, carried out by a decoding circuit 150, allows to decode (in an error region decoding stage 151) the small contour segments that form the error regions. A similar process as the one used for the decoding stage 132 can be used, the main difference being now that one deals no longer with the whole contour of a region but only with pieces of contour. At the output of the decoding stage 151, a so-called over-partition, made of the intersection between the compensated regions and the set of transmitted error regions, is available. A label decoding stage 152 then allows to decode the labels of the regions of this overpartition, and these labels are assigned.

Obviously the invention also relates to a method of coding a sequence in which the images are already available under the form of successive segmented images comprising a plurality of regions and associated labels defining partitions. The method then does not comprise the first transforming step, and is consequently carried out by a coding system that no longer comprises a segmentation device, since successive partitions comprising a plurality of regions are already available.

What is claimed is:

1. A method of coding an image sequence, comprising the steps of:

transforming the images of said sequence into successive segmented images comprising a plurality of regions and associated labels defining partitions;

estimating for the regions of the current partition a motion information about the evolution of said segmentation from the previous partition;

encoding the contour and texture of each region of said current partition;

generating on the basis of said encoded partition a corresponding reconstructed partition;

wherein the motion information estimation step comprises, in cascade, the sub-steps of:

defining, for each region of said current partition, on the basis of a comparison between this current partition and a partition compensated from said reconstructed partition and said motion information, one of an intra-frame and interframe contour transmission mode;

defining, for each pair of neighboring regions of said current partition, on the basis of a comparison between respective motion informations associated to these two regions, an auxiliary order information and an updated motion information, said updated information being obtained by performance of a contour transmission mode definition sub-step wherein the order information is sent backwards in order to constitute a loop whereby said order information updates the definition of said contour transmission mode.

2. The coding method as claimed in claim 1, wherein:

(A) said contour transmission mode definition sub-step comprises, for each region individually, the steps of:

compensating, on the basis of the motion information associated with each successive region of the current partition, said corresponding reconstructed partition;

completing, on the basis of a comparison between said current partition and said corresponding compensated partition, a compensation error;

generating as a motion information and, on the basis of a comparison between coding costs of said current partition and said compensation error, a decision related to the transmission mode of the contour of the concerned region;

(B) said auxiliary order information definition sub-step comprises the steps of:

defining a motion vector for each position inside the concerned region and assigning said vector to all points of the current partition;

generating the order information corresponding to each of the concerned regions, on the basis of a comparison between said current partition and said reconstructed partition, when considering said assigned vector;

quantizing said order information by comparing for each pair of labels associated with two concerned regions the number of occurrences where the first label has been declared to be in the foreground of the second one and the reciprocal number and selecting the largest one.

* * * * *